May 9, 1961 G. K. HAUSE 2,983,160
TRANSMISSION SELECTOR CONTROL
Filed Sept. 8, 1959 2 Sheets-Sheet 1

INVENTOR.
Gilbert K. Hause
BY
Hugh L. Fisher
ATTORNEY

May 9, 1961 G. K. HAUSE 2,983,160
TRANSMISSION SELECTOR CONTROL
Filed Sept. 8, 1959 2 Sheets-Sheet 2

INVENTOR.
Gilbert K. Hause
BY
Hugh L. Fisher
ATTORNEY

United States Patent Office
2,983,160
Patented May 9, 1961

2,983,160

TRANSMISSION SELECTOR CONTROL

Gilbert K. Hause, Franklin, Mich., assignor to General Motors Corporation, Detroit, Mich., a corporation of Delaware Filed Sept. 8, 1959, Ser. No. 838,650

7 Claims. (Cl. 74—473)

This invention relates generally to selector controls and particularly to selector controls adapted, although not exclusively, for use with vehicle transmissions.

Any selector control, particularly one contemplated for operating a vehicle transmission, should not only be of a construction that renders it suitable for situating in a position accessible to the operator, but also the selector control should only require conventional movements, e.g., common rectilinear and/or circular movements, so as to avoid special operator training. Moreover, complicated movements tend to confuse operators in times of emergency and can produce in extreme cases, disasters or damage to the transmission.

Another consideration in a selector control is the provision of a detent device for releasably maintaining selected settings of the control so as to inform the operator that the control is in the desired setting. Conventionally these detents are remotely disposed from the selector control. However, if a cable is to represent the interconnection between the selector control and the transmission, the slack or lost motion could conceivably result in false information as to the selected setting.

Also, it is desirable to avoid the accidental selection of certain infrequently used settings at certain times, for instance, Park, Grade Retard, or Reverse. To accomplish this, various somewhat complicated inhibiting arrangements have in the past been provided. For example, stops are furnished on the selector such that the operator must maneuver around the stop to the infrequently used setting. However, an absent-minded operator can usually establish this setting, while maneuvering the selector. Often also, governor-controlled inhibitors are incorporated in the transmission, but these increase the cost and often are complicated.

With the foregoing problems in mind, the invention contemplates a selector control that is by construction, compact and easily manufactured according to accepted mass production techniques; that requires a minimum of space, and hence can be easily made accessible for manual operation; that requires uncomplicated conventional actuating movements; that has a unique detent provision for releasably maintaining selected settings; and that has a novel arrangement for preventing accidental establishment of certain settings.

More specifically, the invention provides a selector control that utilizes primary and secondary members, each coacting in an unusual way to maneuver an output to different selected settings.

Also by the invention the preceding selector control is adapted to have a common detent arrangement for both the primary and the secondary selector members installed in close proximity to the selector control.

The foregoing and other objects and advantages of the invention will be apparent from the following description and from the accompanying drawings in which:

Figure 1 demonstrates a transmission selector control incorporating the principles of the invention mounted on a vehicle instrument panel;

Figure 1:
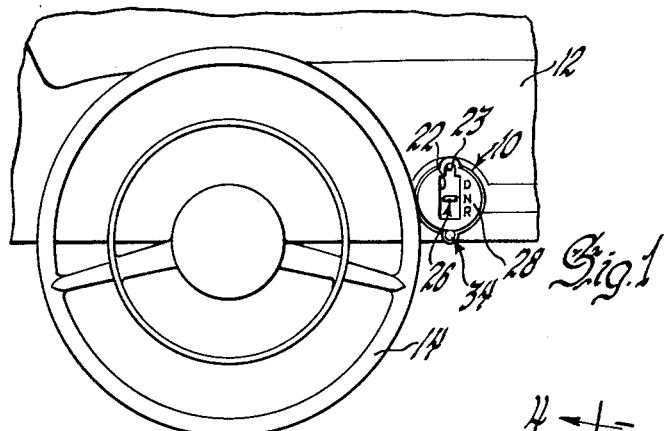

Referring to the drawings in detail, and first to Figure 1, a selector control denoted generally at 10, is shown mounted on a vehicle instrument panel 12 to the right of a steering wheel 14 and is utilized to operate a transmission 15. Of course, the selector control 10 may be positioned elsewhere on the instrument panel 12 if desired, for example, on the left side of the steering wheel 14, or it may be installed someplace in the operator compartment other than on the instrument panel 12. But, the construction does facilitate installation within a minimum space; therefore, mounting the selector control 10 on the instrument panel 12 presents no problem.

Figure 2:
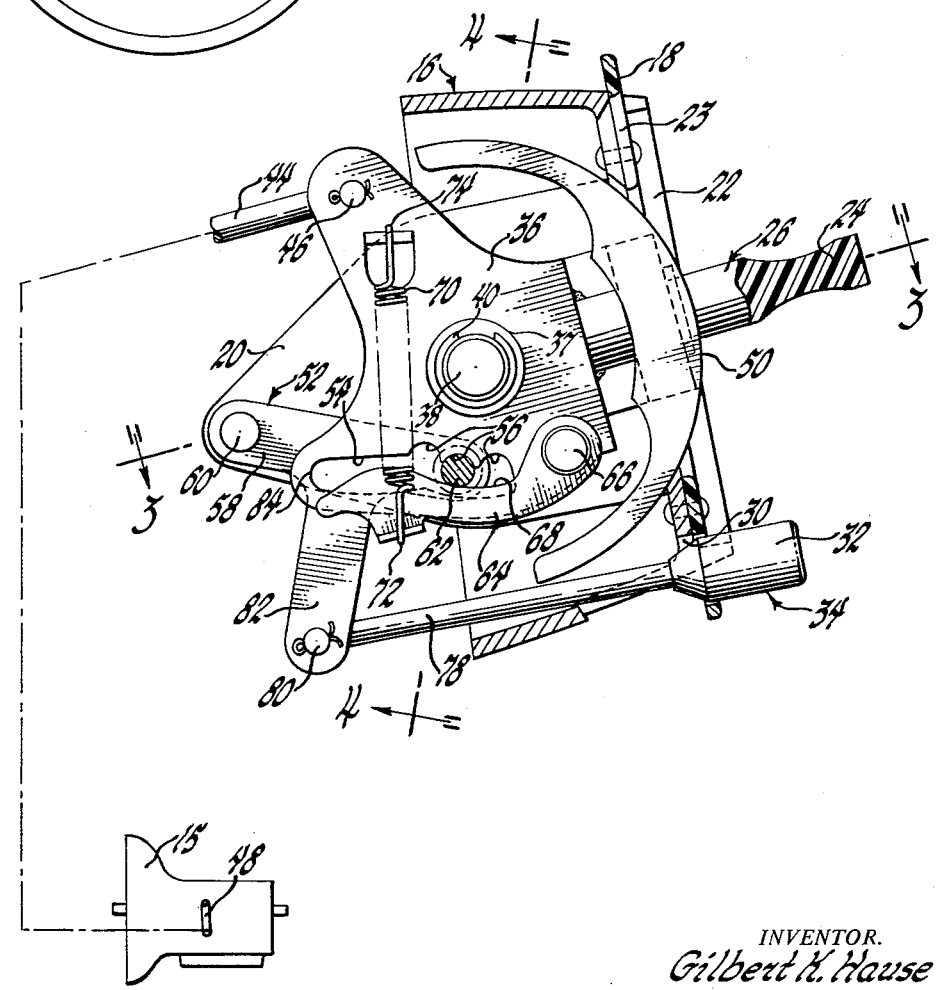
Figure 2 is a sectional view of the selector control illustrating the details thereof.

Next referring to Figure 2, a bracket 16 for the selector control 10 is arranged for suitable attachment to the instrument panel 12 and includes a front cover 18 and a rear extension 20. The front cover 18 has an elongated opening 22 terminating in a narrowed upper portion 23. A knob 24 for a primary selector member viewed at 26 extends through this opening 22 and is adjacent legends 28 on the cover (see Figure 1) indicating the different transmission settings, e.g., Drive, Neutral, and Reverse. Below the elongated opening 22 and also in the cover 18 is a circular opening 30 through which a button end 32 of a secondary selector member 34 extends. This button end 32 may be operated, as will be explained, to obtain some secondary or infrequently used settings as Park, or Grade Retard, both of which are only used under certain conditions with automatic transmissions. Otherwise, damage can result to the transmission.

Figure 3:
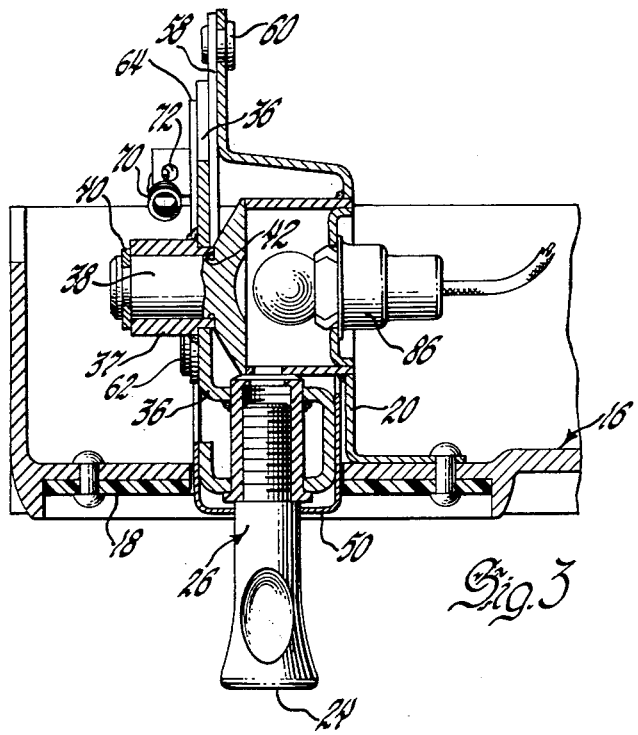
Figure 3 is a sectional view of the selector control taken along lines 3—3 of Figure 2.
Figure 4:
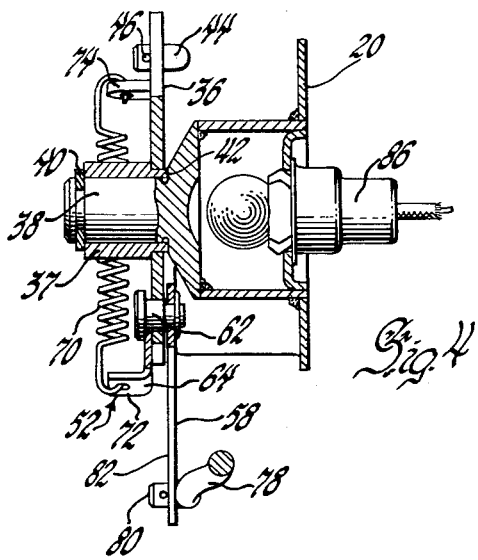
Figure 4 is another sectional view of the selector control taken along line 4—4 of Figure 2.

The primary selector member 26 as best observed in Figures 2 and 3 includes in addition to the knob 24, a lever 36 opposite the knob 24. The lever 36 is formed with a hub 37 that is installed on a stub shaft 38 constituting a part of the bracket rear extension 20. The lever 36 at the hub 37 is fixed axially relative to the bracket extension 20 between a snap ring 40 and a shoulder 42 on the extension 20. Consequently, the primary selector member 26 is revolvable on the bracket 16 by this mounting and in turn maneuvers through a cable or linkage 44 pivotally joined thereto at 46 an external shift lever 48 for the transmission 15. The internal components of the selector control 10 during this rotary movement of the primary selector lever 26 relative to the bracket 16 are obscured by an arcuate mask 50 carried by the primary selector lever 26.

The various transmission statuses have corresponding settings of the primary selector member 26 and the secondary selector member 34, each of which settings is releasably maintained by a detent device illustrated generally at 52. This device 52 includes a detent track or slot 54 formed in the lever 36, which slot 54 has a series of stops as notches 56 corresponding to each of the statuses of the transmission, in this instance, Drive, Neutral, and Reverse. A detent element or carrier 58 pivoted at 60 on the bracket rear extension 20 has at the opposite end a pin 62 that is confined within the detent slot 54 and is of a diameter that fits each of the notches 56. This detent slot 54 therefore affords a guide track for the pin 62 and controls the pivotal movements of the detent carrier 58.

For holding the pin 62 in selected ones of the notches 56, a bias arm 64 is employed. This bias arm is pivoted at 66 and has the upper surface 68 thereof in engagement with the bottom side as observed in Figure 2 of the pin 62. An extension spring 70 has one end joined to the bias arm 64 at 72, a predetermined distance from the pivot point 66, and the opposite end 74 connects to the lever 36, such that the force from the spring 70 must be overcome in order to move the lever 36 from one setting to another.

The secondary selector member 34 in addition to the button end 32 includes a rod 78 that is pivotally joined at 80 to a depending arm 82 of the detent carrier 58. Hence, when the button end 32 is maneuvered inwardly relative to the instrument panel 12, the detent carrier 58 is revolved clockwise as seen in Figure 2 about the pivot point 60. To revolve in this manner, the bias of the spring 70 must be overcome and the pin 62 will be caused to travel along the detent slot 54 and to a recess 84 corresponding to the special setting assigned the secondary selector member 34. This special setting, as mentioned, can be the Park or Grade Retard setting. To proceed to the recess 84, the pin 62 will force the lever 36 to revolve counterclockwise and accordingly maneuver the cable or linkage 44 in the corresponding direction. When the primary selector member 26 is maneuvered by the secondary selector member 34 in this manner, the primary selector member knob 24 will move into the narrowed part 23 of the elongated opening 22.

A lamp 86 is installed to the bracket rear extension 20 in the vicinity of the axis of rotation for the primary selector member 26 and communicates with a proper source of electric energy, e.g., the vehicle battery (not shown). Suitable passages for light are formed so as to illuminate the disposition of the primary selector member knob 24 relative to the legends 28. Also, different colored lenses may be employed so as to make each position a different color for easy identification at night.

To briefly summarize the operation of the selector control 10, it will first be assumed that normal operation is wanted, and therefore, the primary selector member 26 is maneuvered between the Drive, Neutral and Reverse settings denoted on the cover 18. As the primary selector member 26 is pivoted about the bracket stub shaft 38, the force from the detent device 52 is overcome and the detent pin 62 moved in and out of the notches 56, advising the operator when the manual selector member 26 is in each of the settings. The rotation of the primary selector member 26 is transferred to the cable or linkage 44 and maneuvers the transmission external shift lever 48 to the corresponding settings.

This movement of the primary selector member 26 does not alter the position of the detent carrier 58 sufficiently to change the position of the secondary selector member 34 appreciably. If the notches 56 each are radially displaced the same amount from the rotational axis of the primary selector member 26, the position of the secondary selector member 34 will always be the same except the slight movement resulting when the pin 62 moves from one notch to the other. If such slight movement is objectionable, a lost motion type provision can be provided, as will be understood by those versed in the art.

If the operator chooses the secondary setting, normally his hand must be removed from the primary selector member knob 24 before the secondary selector member button end 32 may be actuated. This insures that the operator intends to establish the secondary position by a positive act. Then in the foregoing manner, when the button end 32 is depressed, the detent carrier 58 is revolved so that through the detent device 52, the primary selector member 26 is revolved to the extreme upper position shown in Figure 2 with the corresponding movement being transferred via cable or linkage 44 to the transmission external shift lever 48.

From the foregoing it can be seen that the selector control 10 provides two different selector members but combines each of their movements so as to operate a single output. In this manner, the primary selector member 26 is maneuvered by the secondary selector member 34 to the special setting but requires that the operator remove his hand from the primary selector member 26 thus avoiding accidental operation. The detent device 52 employed serves both the primary and secondary selector members with a minimum of parts. Additionally, the detent device 52 coacts directly with the primary and secondary selector members so that the settings of the selector control 10 will be more positive and uninfluenced by the lost motions from the cable or linkage 44 extending to some remote point as the transmission external shift lever 48.

The invention is to be limited only by the following claims.

I claim:

1. In a selector control, the combination of support means, an output, a primary selector member mounted on the support means for movement to a plurality of settings including a secondary setting and at least two other settings, the primary selector member being arranged so as to move the output to corresponding settings, and a secondary control member maneuvering the primary selector member to the secondary setting.

2. In a selector control, the combination of support means, an output, a primary selector member mounted on the support means for movement to a plurality of settings including a secondary setting and at least two other settings, the primary selector member being arranged so as to move the output to corresponding settings, detent means disposed in close proximity to the primary selector member for releaseably maintaining each of the settings, and a secondary control member coacting with the detent means so as to move the primary selector member to the secondary setting.

3. In a selector control, the combination of support means, an output, a primary selector member mounted on the support means for movement to a plurality of settings including a secondary setting and arranged so as to move the output to corresponding settings, the primary selector element having a control surface thereon, detent means releaseably maintaining each of the settings, the detent means including a detent element pivotally supported on the support means and engaging the selector member control surface, and a secondary control member arranged so as to pivot the detent element and thereby cause the primary selector member to be moved to the secondary setting.

4. In a selector control; the combination of a support bracket; an output; a primary selector member pivotally mounted on the support bracket for movement to a plurality of settings including a secondary setting and arranged so as to move the output to corresponding settings; the selector member being provided with a detent slot having stop surfaces corresponding to each of the settings; detent means releasably maintaining each of the settings; detent means including a detent element pivotally supported on the support bracket and having a portion thereof confined within the detent slot, a bias arm pivotally mounted on the primary selector member, and a spring causing the bias arm to urge the detent element into engagement with selected ones of the stop surfaces in the detent slot; and a secondary control member arranged so as to pivot the detent element and thereby cause the primary selector member to be moved to the secondary setting.

5. In a vehicle transmission selector control adapted for installation on a vehicle instrument panel; the combination of a support bracket attached to the instrument panel; a primary selector member mounted on the support bracket for movement to a plurality of settings including a secondary setting; the primary selector element having a control surface thereon provided with stops corresponding to each of the settings; detent means releasably maintaining each of the settings; the detent means including a detent element pivotally supported on the support bracket and engaging the selector member control surface and bias means urging the detent element into engagement with selected ones of the stops; and a secondary control member coacting with the detent means so as to move the primary selector member to the secondary setting.

6. In a vehicle transmission selector control adapted for installation on a vehicle instrument panel; the combination of a support bracket attached to the instrument panel; a primary selector member pivotally mounted on the support bracket for movement to a plurality of transmission settings including a secondary setting; the selector member being provided with a detent slot having stop surfaces corresponding to each of the settings; detent means releasably maintaining each of the settings; the detent means including a detent element pivotally supported on the support bracket and having a portion thereof confined within the detent slot, a bias arm revolvably supported on the primary selector element, and a spring causing the bias arm to urge the detent element confined portion into engagement with selected ones of the stop surfaces in the detent slot; and a secondary control member arranged so as to pivot the detent element and thereby cause the primary selector member to be moved to the secondary setting.

7. In a selector control; the combination of support means; a selector member mounted on the support means for movement to a plurality of settings; the selector member being provided with a control surface having a series of stops therealong corresponding to each of the settings; and detent means releasably maintaining each of the settings; the detent means including a detent element pivotally supported on the support means and having a portion thereof positioned adjacent the control surface, a bias arm pivotally mounted on the selector member, and a spring causing the bias arm to urge the detent element into engagement with the control surface and against selected ones of the stops.

References Cited in the file of this patent

UNITED STATES PATENTS

| | | |
|---|---|---|
| 1,532,868 | Blackburn | Apr. 7, 1925 |
| 2,481,167 | Siever | Sept. 6, 1949 |
| 2,847,874 | McCordic et al. | Aug. 19, 1958 |